Patented Dec. 10, 1940

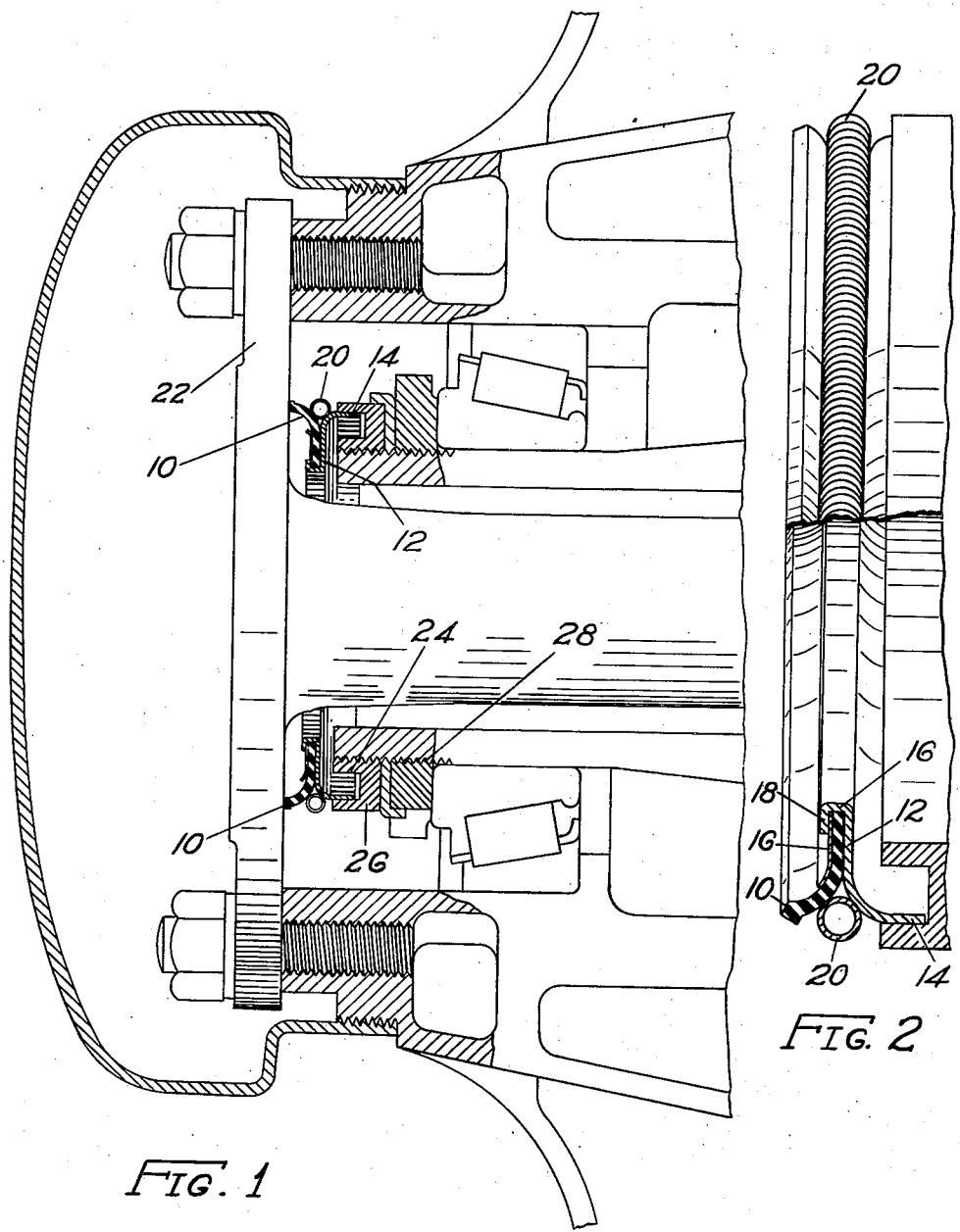

2,224,449

UNITED STATES PATENT OFFICE 2,224,449

OIL SEAL WITH OUTSIDE SPRING

Joseph M. Schmied, Chicago, Ill., assignor to Victor Manufacturing & Gasket Company, Chicago, Ill., a corporation of Illinois Application October 29, 1938, Serial No. 237,703

3 Claims. (Cl. 288—3)

This invention relates to an improved oil seal with outside spring and has, for one of its principal objects, the provision of a sealing element which is especially adapted for end-thrust sealings against oil, fluids, dust or the like and which shall be economically constructed, readily installed, and effective in operation.

One of the important objects of this invention is to provide an oil seal which includes an expansion or garter spring which, while acting compressively, serves to actually expand the flexible sealing element against a surface for a sealing relationship therewith.

Another object of the invention is the provision of an oil seal or the like which shall be composed of a minimum of parts and which can be installed without the aid of a special mounting tool and which, furthermore, will require very little space when assembled into a machine or the like with which it is adapted to cooperate.

Other and further important objects of the invention will be apparent from the disclosures in the accompanying drawing and following specification.

The invention, in a preferred form, is shown in the drawing and hereinafter more fully described.

In the drawing:

Figure 1 is a side elevation, partly in section, showing the improved oil seal with outside spring of this invention and illustrating same as assembled in operative relationship with certain machine parts.

Figure 2 is an enlarged detail view, partly in section, showing the improved seal.

As shown in the drawing:

The reference numeral 10 indicates generally the actual sealing element of the improved oil seal of this invention, the same comprising a flexible member, preferably of synthetic rubber, but which may be of leather or some other suitable material.

The same is mounted in a housing or support which includes an annular metal shell 12 having a rearwardly bent spring-like extension 14 and an inner peripheral face 16 which is then turned over into a clinching edge 18. This clinching edge acts against a washer 16 which is also of metal, but somewhat lighter gaged than the metal of the main shell portion and which is inwardly bent to a slight degree at its outer face so as to conform to the contour of the flexible sealing element 10. The edge 18 grips or clamps the assembly into operative relationship, and a garter spring 20 is applied to the same so as to force the flexible element 10 outwardly into proper sealing relationship with some flat surface such as the element 22 of Figure 1.

The seal itself is especially designed for application to the rear axles of automotive vehicles such as trucks or the like, and the inwardly flared edge 14 can be conveniently inserted in a slot or groove 24 which is formed in a ring portion 26 which comprises a usual part of such a rear axle assembly, all as best illustrated in Figure 1.

It will be noted that this element 26 is in the shape of a ring which is mounted on a screw-threaded portion 28 of a part of the axle structure, and a corresponding adjustment of the relationship of the parts can be readily had whereby the sealing action of the flexible diaphragm 10 can be accurately regulated, and, of course, this is enhanced by the compressive force of the spring 20.

Any wear that does occur is automatically taken up by the action of the encircling garter spring, and the flexibility of the diaphragm also serves to compensate for slight irregularities in the relationship of the various parts while, at the same time, a satisfactory sealing surface is assured on account of the particular type of offset face provided at the sealing edge of the diaphragm itself. This is best shown in Figure 2.

The inwardly turned flange 14 may be, of course, varied both as to size and contour in order to conform to particular requirements or special situations without in any way interfering with the action or construction of the remaining parts.

I am aware that many changes may be made and numerous details of construction varied throughout a wide range without departing from the principles of this invention, and I, therefore, do not purpose limiting the patent granted hereon otherwise than as necessitated by the prior art.

I claim as my invention:

1. In an oil seal, a sustaining shell, said shell comprising an annular metal structure with its outer peripheral edge flared rearwardly for spring contact with a support, a flexible diaphragm mounted in the shell for sealing action at the face of the seal opposed from the flare of the shell, a garter spring mounted in the space between the inner face of the diaphragm and the flared edge of the shell and around the outer periphery of the seal, and a reinforcing washer in the shell positioned against the outer face of the diaphragm.

2. In an oil seal, a sustaining shell, said shell comprising an annular metal structure with its outer peripheral edge turned rearwardly for springing contact with a support, a flexible diaphragm mounted in the shell for sealing action at that face of the seal opposed from the turned edge of the shell, a garter spring mounted in the space between the diaphragm and the turned edge of the shell and around the outer periphery of the seal, and a reinforcing washer in the shell positioned against the outer face of the diaphragm, said reinforcing washer being flexed to correspond to the contour of the sealing element.

3. In an oil seal, a sustaining shell, said shell comprising an annular metal structure with its outer peripheral edge flared for press-fit contact with a support, a flexible diaphragm mounted in the shell for sealing action at the face of the seal opposed from the flare of the shell, a garter spring mounted in the space between the inner face of the diaphragm and the flared edge of the shell and around the outer periphery of the seal, a reinforcing washer in the shell positioned against the outer face of the diaphragm, said reinforcing washer being flexed to correspond to the contour of the sealing element, the sealing element being composed of synthetic rubber, and having a flat face with one squared edge, thereby providing a relatively broad side sealing surface.

JOSEPH M. SCHMIED.